United States Patent Office 3,350,048
Patented Oct. 31, 1967

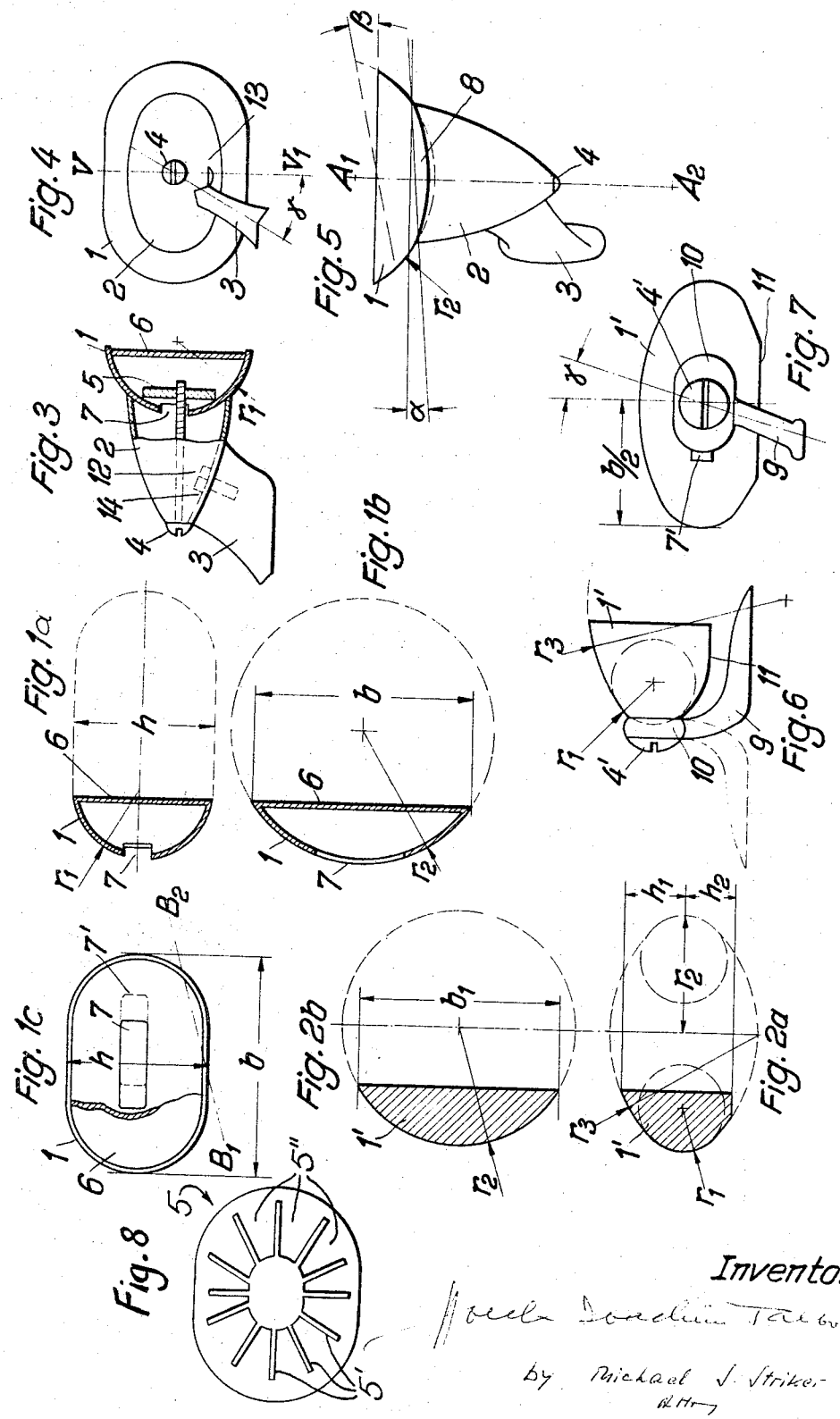

3,350,048
EXTERNAL REAR-VIEW MIRROR FOR VEHICLES
Yorck Joachim Talbot, 80 Ebersstrasse, Berlin 2, Germany
Filed May 14, 1964, Ser. No. 367,471
Claims priority, application Germany, May 15, 1963, T 23,994
15 Claims. (Cl. 248—481)

ABSTRACT OF THE DISCLOSURE

A vehicle rear-view mirror including a base member having a first portion which is adapted to be connected to the coachwork of a vehicle, and a second portion provided on the first portion. The second portion has an opening of substantially elliptical outline whose longer axis extends substantially horizontally when the base is connected to the vehicle. A mirror head including a mirror is carried by the second portion and resembles a segment of a three-dimensional body. The mirror head is bounded by an external curved face at least a portion of which is received in the opening, and by a planar face spaced from the opening.

---

The invention relates to external rear vision mirrors for motor vehicles.

Known external mirrors for motor vehicles usually comprise a housing which tapers in the travelling direction, the housing having a rearward opening in which the mirror proper is fixedly arranged or is arranged to be movable within limits. The underside of the housing is fixedly or pivotally movably connected with a foot part which is screwed to the body work of the vehicle.

In another known embodiment, in the rearward opening of the housing, a mirror head part receiving the mirror proper and formed as a section of a sphere is so mounted that it can be displaced in all directions relative to the housing through a predetermined angle into the visual position most favourable for the vehicle driver. This displaceability of the mirror head part relative to the housing imposes the requirements that the rearward housing opening is circular, that the mirror head part represents a true spherical section having a circular base region, in which a correspondingly circular mirror is mounted, and that the diameter of the rearward housing opening is essentially smaller than that of the mirror head part, since otherwise the mirror head would disappear partly within the housing in an extreme displacement position of the mirror head part.

The circular form of the mirror arising from these three requirements is aesthetically satisfactory and starting from the central point of the circle it offers an equally large field of vision in all directions. This latter characteristic of the circular form is on the other hand disadvantageous for the construction of an ideal rear vision mirror for fast traffic on modern multi-lane roads for the following reasons:

In order to give the driver a sufficiently broad rear vision in the horizontal direction of a plurality of adjacently travelling rows of vehicles overtaking each other, such a circular external mirror must be given a considerable diameter. On the other hand, the considerable diameter is practically not needed in the vertical direction, and this unnecessary mirror surface in the vertical direction simply increases the air resistance and the eddy formation in a quite undesirable manner.

The most favourable external rear vision mirror for modern rapid traffic must have a greater extension in the horizontal direction than in the vertical. If, however, from a mirror head part formed from a spherical section with sufficiently large diameter, the unnecessary parts of the circular surface are cut away above and below, then two cutting surfaces with sharp edges are formed, which not only look unpleasant and create increased air eddying, but also bring the disadvantage that for upward or downward inclination of the mirror by the same complete displacement angle an opening in the form of a circular section is formed between the housing rim and the relevant cutting surface, through which water can enter into the housing and which under certain circumstances at high velocities can result in a whistling noise.

It is an object of the invention to provide an external rear vision mirror having a larger dimension in the horizontal direction than in the vertical direction and in which the above described disadvantages of a spherical section from which upper and lower portions have been cut are avoided.

The present invention consists in an external rear vision mirror for a motor vehicle, comprising a foot part adapted for connection to the vehicle bodywork, a member rigidly or pivotally carried by the foot part, and a mirror head part carrying a mirror and which is displaceably positioned relative to an opening of the said member being provided, the mirror head part being formed as a portion of a three dimensional body having a maximum radius of curvature in the vertical direction which is approximately equal to one-half of the height of the said portion and a maximum radius of curvature in the horizontal direction which is greater than the radius of curvature in the vertical direction. The mirror head part may thus have a base region of the desired form, namely approximately that of a square or a rectangle on two opposite sides of which a half circular region is formed. Accordingly, the outer surface of the mirror head part is no longer a spherical section curved with a single radius, but is a three dimensional surface which is a horizontal plane is curved with the large radius and in the vertical plane is curved with the small radius. This geometrical body shape of the mirror head part is aerodynamically favourable in so far as it has no sharply cut surfaces or edges and nevertheless allows the same complete adjustability of the mirror head part in all directions relative to the housing as does the hitherto known spherical section form.

Advantageously, the mirror head part is formed as a portion of a flattened spherical body the periphery of which considered from the equator in the direction towards the poles, is curved firstly with a small radius and subsequently thereto with one or more larger radii.

Preferably, the mirror head part is symmetrically or assymmetrically cut in such manner outside that region of its outer surface which for any desired angular setting of the mirror head part is contacted by the rim of the opening in the said member, that a flat region results which has a different height from the equatorial plane than the height of the oppositely lying edge of the mirror head part. The said member may be a housing formed as a body of rotation but flattened in such manner that its opening has a non-circular shape for co-operating with the mirror head part.

Advantageously, the flattened housing, at its said opening is cut off in a plane extending transversally to the travelling direction obliquely inwardly at an acute angle, the oblique rim of the housing having additional concave cut outs at its upper and its lower side of such a shape that for any displacement position of the mirror head part the housing rim lies closely against the outer surface of the mirror head part. The central axis of the foot part may be obliquely disposed inwardly towards the vehicle central axis relative to the vertical. Preferably, the angle between the vertical and the central axis of the foot part is variable within predetermined limits. The housing may be attached to the foot part by a screw which passes through a slot in the housing, the slot extending transversely to the travelling direction and being closed to the outside in any desired angular position by a cover plate held within the housing by the screw.

The mirror head part may have an elongated opening in the centre of its outer surface or laterally or upwardly displaced relative to this centre, for the passage of a central holding screw for the mirror head part and for limiting the displacement angle of the mirror head part in the horizontal direction, the length of the opening relative to its breadth having approximately the same relation as the horizontal breadth of the mirror head part relative to its vertical height. A holding plate may be provided which serves as a nut for the central holding screw, the holding plate co-operating with the mirror head part and having a shape adapted to the interior shape thereof so as to be positively secured against rotation when tightening the holding screw. The holding plate may be in the form of an inherently resilient part having a plurality of resilient tongues at its edge, the tongues being so arranged as to press against the mirror head part independently of each other in any displacement position of the mirror head part.

It is only necessary for the outer surface of the mirror head part to be curved with the small radius of the shell surface only in the region where it can come into contact with the oval rim of the housing on full utilisation of the displacement angle. Outside this region, the radius with which the surface of the mirror head part is curved can be increased as desired, so that the manufacturer has great freedom in shaping and dimensioning the mirror head part.

It will be appreciated that in connection with external mirrors of streamline form, the provision of a housing which strongly tapers in the travelling direction, in front of the mirror head part which is adjustable relative thereto, is mainly for aerodynamic reasons, namely in order that the air stream is offered as small as possible a surface of action by the front tip of the external mirror, and to a smaller extent also for reasons of pleasantness of shape. The mirror of the present invention can have a mirror head part with such an elongated shape and tapered to such extent in the travelling direction, with full allowance for aerodynamic necessities, that its depth or length viewed in the travelling direction is not much smaller than that of the previously known housing and spherical mirror head part together. When the mirror head part has this elongated shape then for the purpose of reducing manufacturing costs, the housing can be dispensed with and the mirror head part can be displaceably connected direct to the foot part screwed on the vehicle bodywork. For example, in such a case the foot part may have the shape of a hook, the horizontal limb of which is directed in the travelling direction or rearwardly its upwardly extending limb terminating for example in an enlarged eye of oval form substantially adapted to the mirror head part. The oval rim of this eye then performs the same function as the rim of the rearward opening of a separate housing.

In order to make the invention clearly understood, reference will now be made to the accompanying drawings which are given by way of example and in which:

FIG. 1a is a sectional side view through a mirror head part, showing by a broken line the geometric body of which the mirror head part represents a portion;

FIG. 1b is a sectional view of the mirror head part of FIG. 1;

FIG. 1c is a front view of the mirror of FIGS. 1a and 1b;

FIG. 2a is a sectional side view showing the structure of an alternative geometric body of which the mirror head part may represent a portion;

FIG. 2b is a sectional view of FIG. 2a;

FIG. 3 is a partly sectioned side view of a complete external rear vision mirror;

FIG. 4 is a view of the external rear vision mirror of FIG. 3, seen from the travelling direction;

FIG. 5 is a view of the external rear vision mirror of FIG. 3, seen from above;

FIG. 6 is a side view of a simplified external rear vision mirror;

FIG. 7 is a view of the external rear vision mirror of FIG. 6, seen from the travelling direction; and FIG. 8 is a plan view of a cover plate for use with the embodiments illustrated in preceding figures.

In FIGS. 1a, 1b and 1c, in each case a mirror head part is indicated by reference numeral 1. This mirror head part 1 represents a section of a body indicated by broken lines, which has the height $h$, a relatively large radius $r_2$ in the horizontal direction and a smaller radius $r_1$, which is approximately equal to half the height $h$, in the vertical direction. As a section of a body formed in this way, the mirror head part 1 has a somewhat oval base surface at its rearward side, the base surface having the height $h$ and an essentially larger width $b$, within which a mirror 6 is fixedly or alternatively slightly displaceably mounted. For guiding the usual central holding screw, the outer surface of the mirror head part 1 has an elongated opening 7 which may be upwardly offset by a small amount relative to a conceptual central line through the mirror head part 1, in order that the mirror head part 1 can be displaced upwardly into a more inclined position to the vertical than downwardly. This meets the practical requirements in so far as in almost all cases the eyes of the driver lie higher above the ground than the centre of the mirror head part 1.

In accordance with practical requirements, in order to be able to move the mirror head part 1 inwardly towards the centre of the vehicle through a greater angle than outwardly, an opening 7' may be provided, which is indicated in FIG. 1c by a broken line and which is horizontally inwardly displaced.

As is also visible from FIG. 1c, the mirror head part 1 has a base surface which is a symmetrical oval of the height $h$ and the breadth $b$. If desired, alternatively an asymmetrical base surface of the mirror head part 1 can be achieved, if for example a piece is cut therefrom, which is indicated in FIG. 1c by the broken line $B_1-B_2$. The same or a similar cut can also be effected at the upper side of the mirror head part 1 or alternatively at other regions. Too much must not be cut off however, so that later with the maximum displacement of the mirror head part 1, the cut faces do not partly disappear into the housing and leave openings free through which water can penetrate into the housing.

Essentially the same is true also for the differently shaped mirror head part 1' illustrated in FIGS. 2a and 2b. As can be seen from FIG. 2a, this mirror head part 1' represents a section of a geometric body indicated in the broken line, which could best be described as a flattened spherical body. This flattened spherical body has a greatest diameter of $2r_2$ at its equator and its peripheral surface starting from the equator towards the north pole and the south pole firstly has a small radius $r_1$ and is thereafter rounded off with a greater radius $r_3$. The mirror head part 1' cut from this flattened spherical body is indicated in FIGS. 2a and 2b by shading. In the horizontal direction the mirror head part 1' has a breadth $b_1$ and in the vertical direction has a total height $h_1+h_2$. The height $h_2$ is smaller than the height $h_1$, since a piece is cut from the mirror head part 1' at the lower side, so that a cut surface 11 results. With a mirror head part 1' cut in this way, the danger does not exist that the cut surface 11 partly disappears into the housing, since even with maximum displacement of the mirror head part 1' the housing only lies against the outer surface rounded off with the small radius $r_1$.

In FIGS. 3, 4 and 5 a mirror head part 1 of the above described form is shown displaceably mounted in the rearward opening of a housing 2 and is held by a screw 4 which engages in an oval plate 5 after passing through the housing 2 and the elongated opening 7 in the mirror head part 1. If the screw 4 is tightened, then the plate 5, as a result of its oval form does not rotate within the also oval interior of the mirror head part 1. The plate 5 can if desired be manufactured of rigid or alternatively of elastic material. Thus for example the plate 5 may be made of spring steel and provided with a plurality of radial slits, the tongues formed thereby pressing independently of each other against the inner wall of the mirror head part 1.

The housing 2 is advantageously produced as a body of rotation and subsequently somewhat flattened in such a manner that the rearward opening of the housing 2 forms an oval of a shape suited approximately to the mirror head part 1 or 1'. The rearward housing rim viewed from above, is cut at an angle $\beta$ obliquely towards the central axis $A_1$–$A_2$ (see FIG. 5) inwardly in the direction towards the centre of the vehicle, and furthermore this housing rim has arcuate cut outs 8 at each of the upper and lower sides, by means of which the housing rim always lies tightly against the outer surface of the mirror head part 1 or 1' which is curved with two different radii, in any desired displacement position of the mirror head part 1 or 1'. The mirror head part 1 can be displaced relative to the housing 2 in the horizontal direction additionally by an angle $\beta$, the size of which is determined by the height and the arrangement of the opening 7 in the mirror head part 1. Accordingly, the mirror head part 1 can be displaced inwardly relative to the central axis $A_1$–$A_2$ by maximum angle of $\alpha+\beta$. The maximum displacement angle of the mirror head part 1 or 1' in the vertical direction is determined by the height and the central or non-central arrangement of the opening 7 in the mirror head part 1. Advantageously, the displacement angle $\alpha+\beta$ in the horizontal direction is related to the displacement angle in the vertical direction somewhat as the horizontal breadth $b$ or $b_1$ of the mirror head part 1 or 1' is related to its height $h$ or $h_1+h_2$.

The mirror 6 may be fixedly mounted in the rearwardly directed opening of the mirror head 1. In order to achieve an extreme displaceability however, the mirror 6 may be mounted in the mirror head part 1 so as to be slightly displaceable therein.

In order to be able to more easily mount the rear vision mirror on the rounded off or obliquely angled side face of modern coach work, so that as far as possible the complete mirror surface extends beyond the contour of the windscreen and can be fully used for rear vision, the foot part 3 to be screwed to the vehicle coach work is non-centrally displaced on the housing 2, namely by the angle $\gamma$ relative to the vertical central line V—V, (see FIG. 4). This angle $\gamma$ thus extends always from the vertical line V–$V_1$ towards the centre of the vehicle. The lower side of the foot part 3 is preferably formed in the shape of a hollow prism in order to achieve a secure seating on any arbitrary curvature or angling of the coach work. The foot part 3 is connected with the housing 2 in the above described oblique position by one or more screws 12 (see FIG. 3) which extend through one or more holes in the lower housing wall. In order to be able to alter the angle between the central axis of the foot part 3 and the vertical line V–$V_1$ within certain limits, instead of one or more holes the housing may alternatively have one or more elongated slits 13 (see FIG. 4) which then allow a limited displacement of the housing 2 relative to the foot part 3 transversely to the longitudinal axis of the vehicle. In order to seal the part of this split which is open at any time, a suitably perforated plate 14 which corresponds to the internal shape of the housing 2 is placed under the screw heads 12.

In the embodiment of an external rear vision mirror illustrated in FIGS. 6 and 7, a mirror head part 1' which is curved on its other surface with three different radii $r_1$, $r_2$ and $r_3$ is directly displaceably connected with a hook shaped foot part 9, that is to say not by means of an additional housing 2 as in FIGS. 3 to 5, by means of an oval eye 10 in the foot part 9.

The displaceability of the mirror head part 1' relative to this eye 10 is determined by the length, the breadth and the central or non-central arrangement of the opening 7' in the outer surface of the mirror head part 1'. In FIG. 7, which illustrates an external rear vision mirror in its initial position, that is to say exactly transverse to the vehicle central axis, part of this opening 7' extends beyond the eye 10 towards the centre of the vehicle. If, as necessary, the external rear vision mirror is displaced inwardly towards the driver into the position of use, then the opening 7' completely disappears within the eye 10.

By suitable dimensioning of the breadth and length of the opening 7' in the mirror head part 1' it is achieved that with maximum displacement in any possible direction the mirror head part 1' always bear against the eye 10 with that part of its outer surface which is rounded off with the small radius $r_1$. The adjoining part of the outer surface which is rounded off with the radius $r_3$ thus always remains outside the eye 10 and as a result of this can be freely shaped. In the embodiment shown in FIGS. 6 and 7, the mirror head part 1' for aerodynamic and aesthetic reasons has a relatively large depth in the travelling direction, so that viewed from the side it appears to extend almost as far as a shallower mirror head part and a housing would together appear to do. By suitably stepping the radii $r_1$, $r_2$ and $r_3$ relative to each other, the manufacturer has very many possibilities, within certain limits, of shaping the mirror head part 1', so that it offers a small or narrow surface of action for the air stream at its tip which extends in the travelling direction. This surface of action can be still further reduced if the eye 10 of the foot part 9 likewise has a shape which tapers in the travelling direction and if the securing screw 4' has a suitably pointed head. In order to be able to use the external rear vision mirror as universally as possible, the construction of the foot part 9 is such that its horizontal limb can be mounted either so as to extend in the travelling direction or so as to extend rearwardly. The cover plate 5, which has been mentioned before, is shown in more detail in FIG. 8. In the illustrated embodiment the plate 5 is of oval configuration and is assumed to be of elastic material. It is provided with a central opening for the screw holding the plate to the assembly, and with radial slots 5' which define a plurality of tongues 5" which, when the plate is pulled toward the mirror head part 1 as shown in FIG. 3, for instance, press independently of each other against the inner wall of the part 1.

I claim:

1. An external rear vision mirror for a motor vehicle having a bodywork, comprising a foot adapted for connection to the vehicle bodywork, a housing member resembling a flattened body of rotation; carried by said foot and including an opening of non-circular outline and a mirror head carrying a mirror and having a head portion displaceably positioned in said opening of said member, said mirror head having a given height and constituting a portion of a three dimensional body having a radius of curvature in the vertical direction which is approximately equal to one half of said height and a radius of curvature in the horizontal direction which is greater than the radius of curvature in the vertical direction.

2. An external rear vision mirror, as claimed in claim 1, wherein said mirror head constitutes a portion of a flattened spherical body the periphery of which, considered from the equator in the direction towards the poles, is curved firstly with a small radius and subsequently thereto with at least one larger radius.

3. An external rear vision mirror as claimed in claim 1, wherein said mirror head constitutes a portion of a flattened spherical body the periphery of which, considered from the equator in the direction towards the poles, is curved firstly with a small radius and subsequently with a plurality of larger radii.

4. An external rear vision mirror as claimed in claim 1, wherein said housing member is elongated in the axial direction of said opening and comprises an edge portion bounding said opening and having an edge face located in a plane extending transversely to the direction of elongation of said housing obliquely inwardly at an acute angle, said edge portion of said housing member having additional concave cut-outs at its upper and its lower side of such shape that for any displacement position of the mirror head the housing edge portion lies closely against the outer surface of the mirror head.

5. An external rear vision mirror as claimed in claim 1, wherein said foot has a central axis obliquely disposed with reference to a vertical line extending in longitudinal direction of said housing member.

6. An external rear vision mirror as claimed in claim 5; and further comprising connecting means movably connecting said housing member and said foot so as to permit adjusting of the angle between the vertical and the central axis of the foot within predetermined limits.

7. An external rear vision mirror for a motor vehicle having a bodywork, as claimed in claim 6, wherein said connecting means includes at least one slot provided in said housing and extending transversely of the elongation thereof, a cover plate disposed within the housing and serving to close said slot to the outside in any desired angular position, and a screw passed through said slot in said housing and cover plate and serving to hold said cover plate in the desired position.

8. An external rear vision mirror as claimed in claim 1, wherein said head portion of the mirror head is provided with an elongated opening coaxial with the central axis of said mirror head; and further comprising a central holding screw for the mirror head extending through said elongated opening operatively connected thereto and to said housing member; whereby said opening serves for limiting the displacement angle of the mirror head in the horizontal direction, the length of said elongated opening relative to its breadth having approximately the same relation as the horizontal breadth of the mirror has relative to its vertical height.

9. An external rear vision mirror as claimed in claim 8, further comprising a screw-threaded holding plate meshing and coacting with said central holding screw, said holding plate co-operating with said mirror head and having a shape adapted to the interior shape of said mirror head so as to be positively secured against rotation when tightening said holding screw.

10. An external rear vision mirror as claimed in claim 9, wherein said holding plate is an inherently resilient element having a plurality of resilient tongues at its edge, said tongues being so arranged as to press against the mirror head independently of each other in any displacement position of the mirror head.

11. An external rear vision mirror as claimed in claim 1, wherein said member is an eye-shaped formation integral with said foot.

12. A vehicle rear-view mirror comprising, in combination, a base including a first portion adapted to be connected to the coachwork of a vehicle, and a second portion provided on said first portion and having an opening of substantially elliptical outline whose longer axis extends substantially horizontally when said base is connected to the vehicle; and a mirror head including a mirror and being carried by said second portion, said mirror head being bounded by an external curved face at least a portion of which is received in said opening, and by a planar face spaced from said opening.

13. A rear view mirror as defined in claim 12, said planar face having a height of a given length and extending in substantially vertical direction, and having a width of a length substantially greater than said given length and extending in substantially horizontal direction.

14. A rear-view mirror as defined in claim 13, wherein said curved face has a first radius of curvature substantially parallel to, and a second radius of curvature transversely of, said planar face, said second radius being greater than said first radius.

15. A rear-view mirror as defined in claim 14, wherein said mirror head comprises a segment of a bi-convex body of oval meridional cross-section.

References Cited

UNITED STATES PATENTS

| | | | |
|---|---|---|---|
| 2,071,883 | 2/1937 | La Hodny | 248—481 |
| 2,694,538 | 11/1954 | Consolo et al. | 248—42 |
| 2,860,545 | 11/1958 | Herr et al. | 248—478 |

JOHN PETO, *Primary Examiner.*